July 19, 1927.
H. A. HOLMES
1,636,635
BEE ESCAPE
Filed Dec. 18, 1925
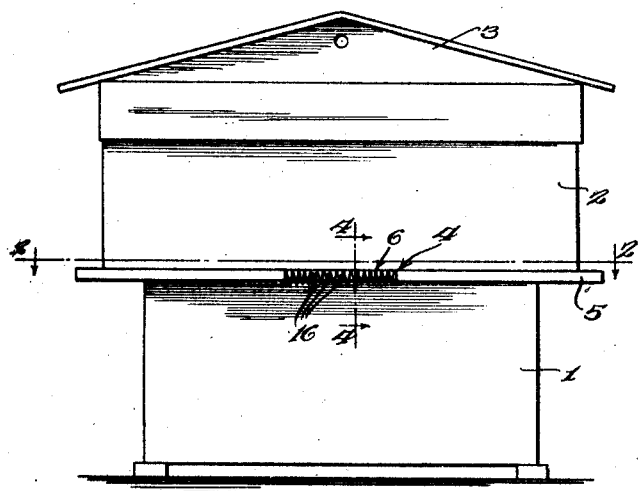
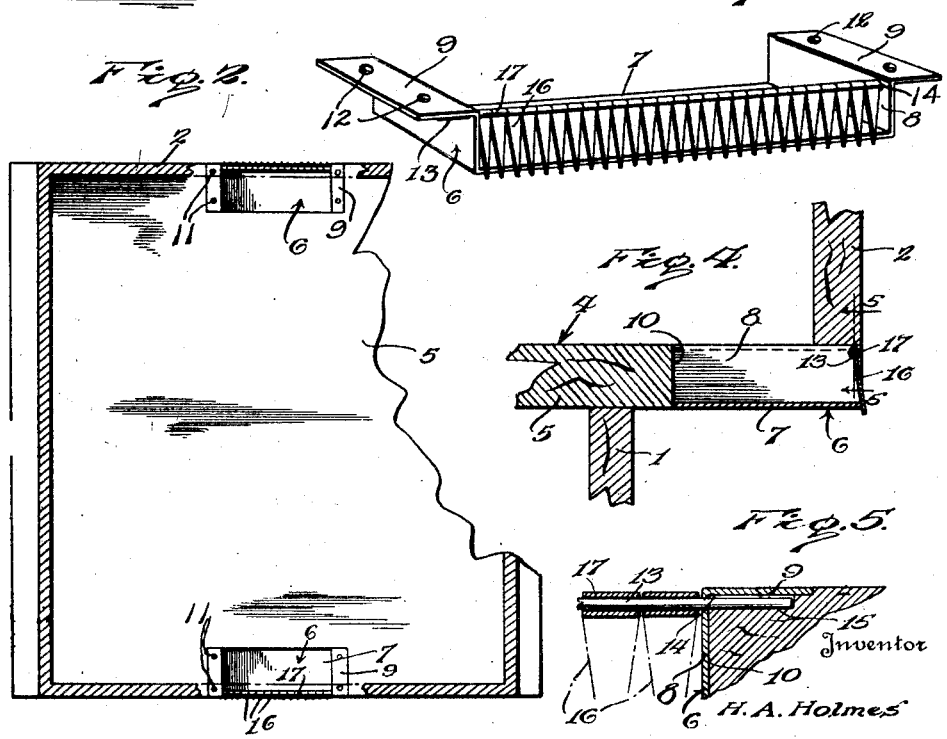

Patented July 19, 1927.

1,636,635

UNITED STATES PATENT OFFICE.

HARVEY A. HOLMES, OF ELYRIA, OHIO.

BEE ESCAPE.

Application filed December 18, 1925. Serial No. 76,248.

This invention relates to improvements in bee escapes for bee hives and has as its general object to provide a bee escape which may be readily installed when it is desired to remove the honey from the super and which will permit of ready escape of all of the bees from the super but prevent their return thereto, so long as the device is in place, thereby enabling the honey to be removed from the hive without any inconvenience to the one performing the task.

Another object of the invention is to provide a bee escape which will be extremely simple in construction and may be manufactured at a low cost and may be installed and removed without the employment of any fastening devices or requiring any reorganization of the structure of the hive itself.

Another object of the invention is to provide a bee escape which will, when installed, not be liable to become disarranged and which will afford ready exit for the bees and effectually prevent their return.

In the accompanying drawings:

Figure 1 is a view in front elevation of a hive of ordinary construction, between the breeding compartment and super of which the bee escape embodying the invention has been installed.

Figure 2 is a horizontal sectional view taken substantially on the line 2—2 of Figure 1, looking in the direction indicated by the arrows.

Figure 3 is a perspective view of the escape proper.

Figure 4 is a vertical sectional view in detail, on the line 4—4 of Figure 1, looking in the direction indicated by the arrows.

Figure 5 is a fragmentary vertical transverse sectional view taken substantially on the line 5—5 of Figure 4, looking in the direction indicated by the arrows with the super of the hive omitted.

The hive, as shown in Figure 1, comprises the usual breeding compartment, indicated by the numeral 1, the super 2, and the cover 3. The escape is indicated in general by the numeral 4 and, generally speaking, the same comprises a rectangular board 5 and the escapes proper, indicated in general by the numeral 6, which are supported in recesses formed in opposite edges of the board, the board being of dimensions greater than the top of the breeding compartment 1, so as to be supported upon said top.

The bee escape proper comprises a body member which is formed of sheet metal and includes a flat rectangular bottom portion 7 which is bent upwardly at right angles at its opposite ends to provide end members 8, which, in turn, are provided with laterally outstanding flanges 9. The board 5 is formed with recesses in its opposite edges and each recess accommodates one of the bee escapes 6. The recesses are indicated by the numeral 10 and the escapes have their body members disposed within the respective recesses, as clearly shown in Figure 2 of the drawings. The body members of the bee escapes and the recesses are of substantially corresponding dimensions so that the end members 8 of the bee escapes will rest against the end walls of the respective recess 10, and the rear edge of the body portion 7 will rest against the inner wall of the recess at the lower side thereof, the said body portion 7 occupying a plane substantially flush with the plane of the under side of the board 5, as clearly shown in Figure 4 of the drawings. The flanges 9 either rest directly upon or are countersunk in the upper side of the board at the opposite ends of the respective recess, and nails or other securing elements 11 are driven through openings 12 formed in said flanges and into the board so as to secure the bee escape unit in place. The bee escape unit further comprises a small wire suspension element which is indicated by the numeral 13 and which is fitted at its end portions through openings 14 formed in the end members 8 of the bee escape, the ends of the suspension element extending beneath the flanges 9 and being preferably seated in grooves 15 formed in the upper side of the board 5 at the opposite ends of the recess. The numeral 16 indicates a plurality of relatively long and narrow V-shaped baffle elements which are formed of sheet metal and have their upper or wider portions formed to provide eyes 17 which are loosely fitted to the suspension wire 13, thus permitting of free swinging movement of the baffles independently of one another. The suspension wire 13 is located near the upper edges of the end members 8 and the baffle elements are of such length that their lower or pointed ends will rest by gravity against the forward or outer edge of the portion 7 of the body member of the bee escape, the said suspension wire or element being spaced inwardly a short distance from the forward edges of the end members 8 so that the baffle elements assume a slightly inclined position, as best shown in Figure 4 of the drawings, and, therefore, as stated, rest lightly at their lower ends, by gravity, against the forward edge of the body portion 7 of the device.

In installing the device in its entirety, the super 2 is lifted from the breeding chamber 1, and the board 5 is disposed to rest upon the top of the said breeding chamber, whereupon the super 2 is disposed upon the upper side of the board 5, with its front and rear walls resting at their lower edges upon the upper side of the board 5 at the front and rear edges thereof and extending directly across and above the open upper side of the escape 6. It will now be evident that when the device is in place, the bees may readily leave the super 2, passing out past the baffles 16, but cannot reenter the super inasmuch as the baffles can swing only in an outward direction. Therefore, they may enter the lower compartment 1 of the hive but are prevented from entering the super, not only because of the presence of the baffles but also due to the fact that the board 5 covers the otherwise open top of the breeding chamber 1. After all of the bees have left the super 2, the super may be removed or the cover 3 thereof removed, and access had to the honey within the super.

It will be readily understood from the foregoing description of the invention, that the device embodying the same may be placed upon the market in a form comprising the board 5 and the escape units 6, or the units themselves may be placed upon the market and installed in a recessed board by the purchaser, the manner of installation being very simple. Therefore, in the claims, where reference is made to a bee escape unit, it is intended to mean the unit shown in Figure 3 of the drawings.

It will be evident that the board 5 constitutes a closure member when the super 2 is removed or, in other words, it closes the otherwise open top of the breeding chamber 1.

Having thus described the invention, what I claim is:

A bee escape comprising a flat body member, end members extending upwardly from the opposite ends thereof and provided with outstanding attaching flanges adapting the escape to be supported and secured within a recess formed in the edge of the closure board of a bee hive, a rod fitted at its ends through the forward upper corner portions of the end members with its said ends projecting beneath the said flanges, the rod extending between the said end members in a vertical plane spaced inwardly with respect to the vertical plane occupied by the forward edge of the body member, and a plurality of baffle members freely pivotally fitted at their upper ends to and suspended from the said rod, the said baffle members being tapered from their upper to their lower ends and resting with their lower end portions in contact with and projecting slightly below the said forward edge of the body member.

In testimony whereof I affix my signature.

HARVEY A. HOLMES. [L. S.]